Sept. 6, 1960     J. P. DARLING ET AL     2,951,524
EMERGENCY TIRE

Filed Dec. 18, 1958     4 Sheets-Sheet 1

INVENTORS
James P. Darling
Charles O. Slemmons
BY
ATTORNEYS

Sept. 6, 1960

J. P. DARLING ET AL 2,951,524

EMERGENCY TIRE

Filed Dec. 18, 1958

INVENTORS
James P. Darling
Charles O. Slemmons
BY
ATTORNEYS

Sept. 6, 1960 J. P. DARLING ET AL 2,951,524
EMERGENCY TIRE
Filed Dec. 18, 1958 4 Sheets-Sheet 3

INVENTORS
James P. Darling
Charles O. Slemmons
BY
ATTORNEYS

Sept. 6, 1960 J. P. DARLING ET AL 2,951,524
EMERGENCY TIRE
Filed Dec. 18, 1958 4 Sheets-Sheet 4
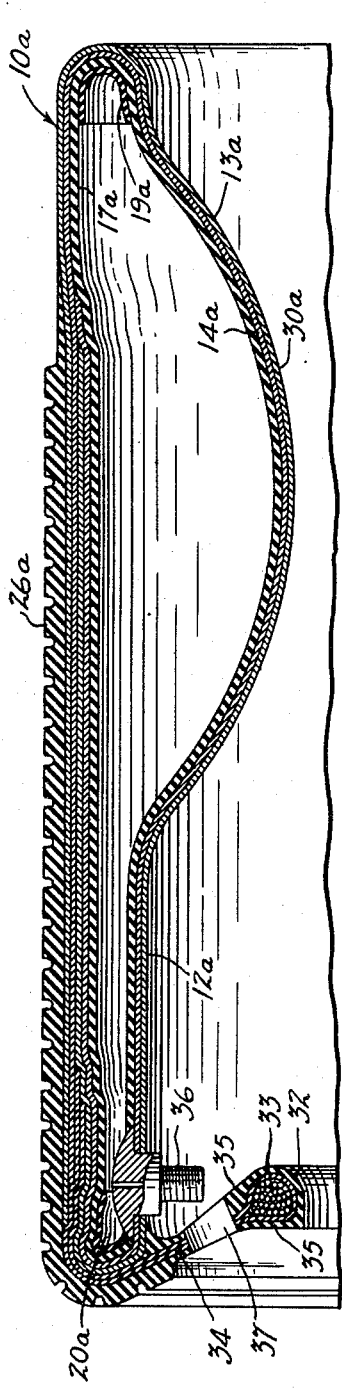
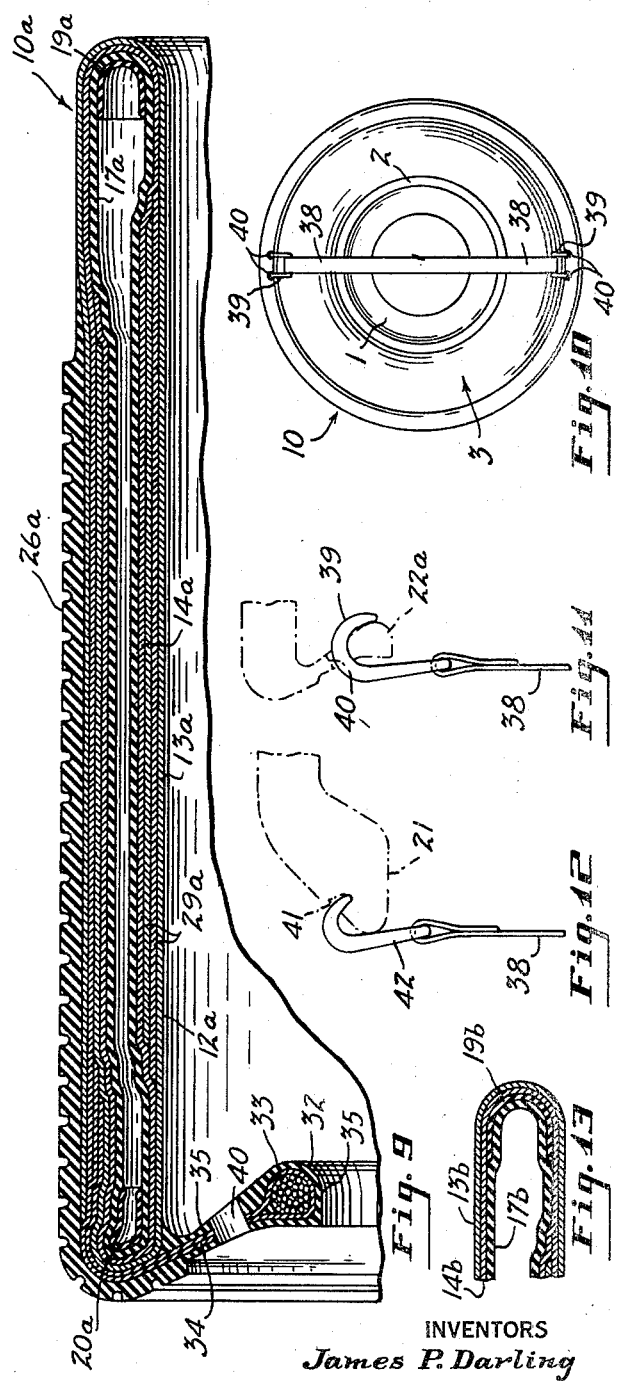
INVENTORS
James P. Darling
Charles O. Slemmons
BY
ATTORNEYS Уnited States Patent Office 2,951,524
Patented Sept. 6, 1960

2,951,524

EMERGENCY TIRE

James P. Darling, Mogadore, and Charles O. Slemmons, Akron, Ohio, assignors to The General Tire & Rubber Company, Akron, Ohio, a corporation of Ohio Filed Dec. 18, 1958, Ser. No. 781,358

9 Claims. (Cl. 152—330)

This invention relates to emergency tires adapted for mounting on a deflated pneumatic vehicle tire, and is an improvement on the tire disclosed in the copending application of Bolster, Kaenan and Pfeiffer, Serial No. 642,447, filed February 26, 1957. As disclosed in said copending application, the emergency tire is an endless fabric reinforced rubber tube that is built and vulcanized to a form transversely flat in cross section for convenient mounting upon the tread of the deflated vehicle tire and that expands to toroidal form upon inflation.

The exterior wall of the tube is provided with a tread portion that is reinforced to resist circumferential stretching so that when the tube is placed in a position encircling the vehicle tire and inflated a radial inward thrust is applied to the tread of the deflated tire that collapses it into the space between the side walls of the tire where it forms a circumferentially undulated seat for the emergency tire.

The emergency tire of the present invention is provided with means for accurately positioning it with respect to the tread of the deflated tire and is so constructed that it applies radial pressure to the vehicle tire tread at circumferentially spaced points so as to collapse the tread in such manner that it has circumferential undulations of uniform angular length.

The collapse of the deflated vehicle tire causes the side walls thereof to bulge beyond the wheel rim flanges and when there is limited clearance between the inner side of the wheel rim and portions of the vehicle body, frame or steering elements, it is desirable to so control the collapse of the tire that the tread is shifted axially outwardly to decrease the inward bulge or overhang of the inner side wall.

The emergency tire of the present invention is so constructed that the tread of the deflated tire can readily be shifted axially outwardly with respect to the wheel rim while it is being collapsed.

Reference should be had to the accompanying drawings forming a part of this specification in which:

Fig. 8 is a transverse section corresponding to Fig. 5 showing a modified form of emergency tire;

Fig. 9 is a section corresponding to Fig. 4 through the modified tire;

Fig. 10 is a front elevation showing a pull strap which may be employed to shift the vehicle tire tread outwardly while the emergency tire is being inflated; and Figs. 11 and 12 are fragmentary detail views showing means for attaching the ned of the pull strap to the beaded skirt of the emergency tire.

Figure 1:
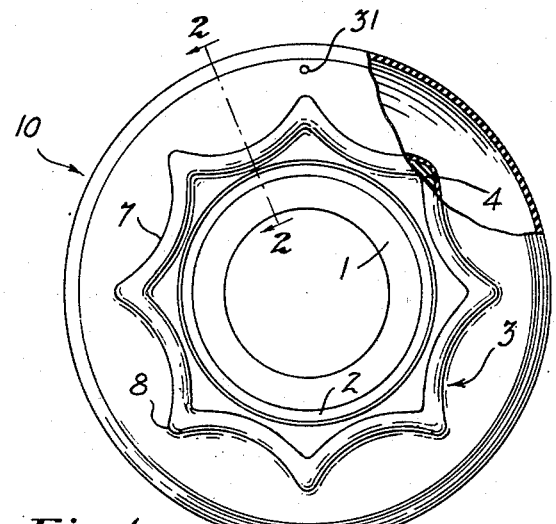
Figure 1 is a side elevation showing the tire of the present invention mounted upon a collapsed vehicle tire.
Figure 2:
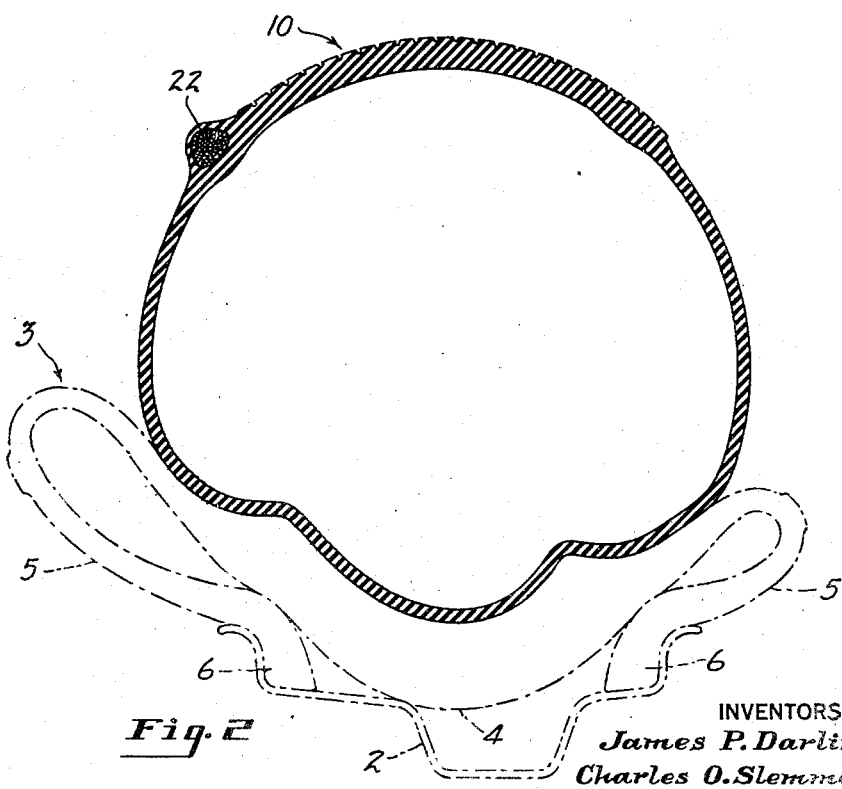
Fig. 2 is a radial section on an enlarged scale, taken on the line indicated at 2—2 in Fig. 1.
Figure 3:
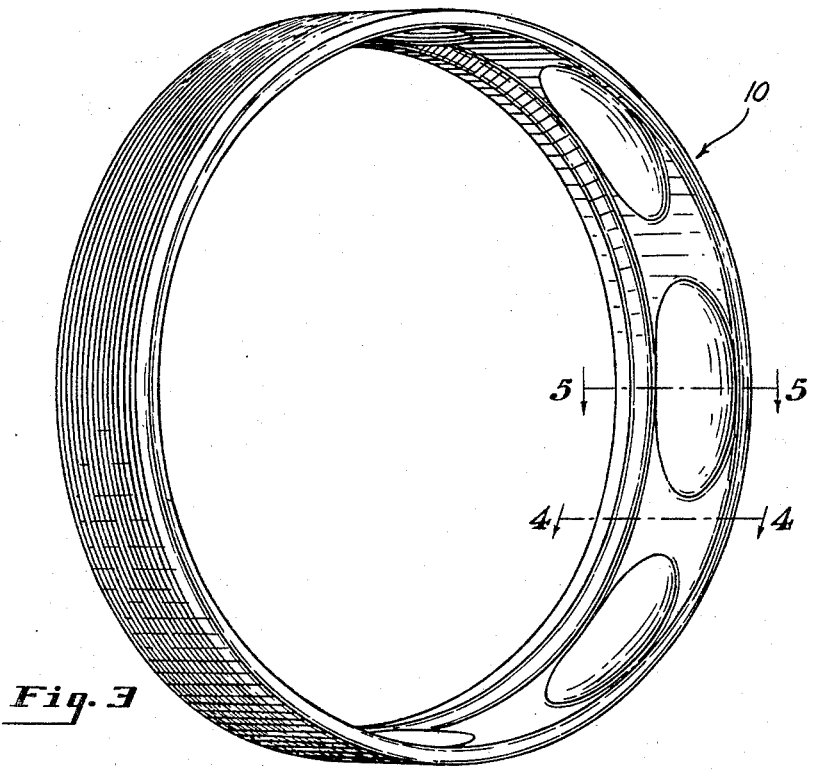
Fig. 3 is a perspective view of the emergency tire of the present invention.
Figure 6:
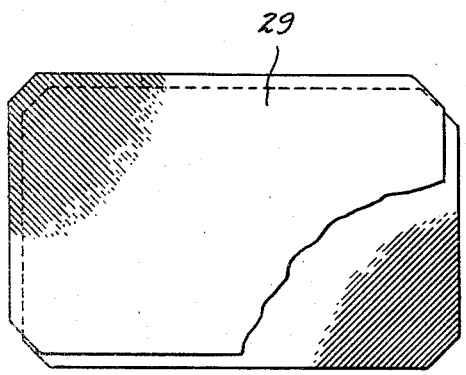
Fig. 6 is a plan view of one of the reinforcing strips employed in the reinforcement of the interior wall of the tire.
Figure 7:
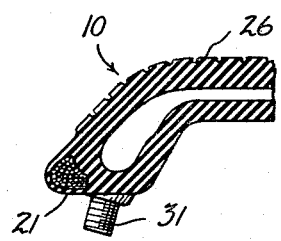
Fig. 7 is a fragmentary view showing the valve stem through which inflation fluid is introduced into the tire.

In Figs. 1 and 2 of the accompanying drawings, the emergency tire of the present invention is shown mounted upon a vehicle wheel 1 that has a flanged tire receiving rim 2, a pneumatic tire 3 provided with a tread 4 and flexible side walls 5 seated in the rim by means of inextensible beads 6 that seat on the rim within the rim flanges.

The emergency tire of the present invention is indicated generally by the numeral 10 and is in the form of an endless, flexible tube that is built and vulcanized to a shape substantially flat in transverse section with closely spaced exterior and interior walls 11 and 12 so that it can readily be placed in position around the tread of the tire 3. The walls of the tube 10 are fabric reinforced and flexible so that upon inflation the tire assumes a toroidal form. The exterior wall 11 is additionally reinforced to resist circumferential stretching so that when the tube is expanded to toroidal form by internal fluid pressure a radial inward pressure will be applied to the tread of the deflated tire sufficient to cause the tread to collapse into the space between the side walls of the tire and, since pneumatic tire treads are not contractible, the tread will assume an undulating form between the collapsed side walls as shown in Fig. 1.

The tube 10 is reinforced with a plurality of plies of bias cut cord fabric. As herein shown, two plies 13 and 14 extend throughout the entire transverse circumference of the tubular tire 10. The plies 13 and 14 are laid one upon the other with their cords in crossing relation preferably at a bias angle of from 20° to 30°. The tire 10 is preferably built upon a cylindrical drum, the plies 13 and 14 being of a width substantially greater than the transverse perimeter of the tire to be formed and opposite side portions of the laminated fabric and rubber band on the drum are folded back over the central portion to form the exterior wall 11.

Figure 4:
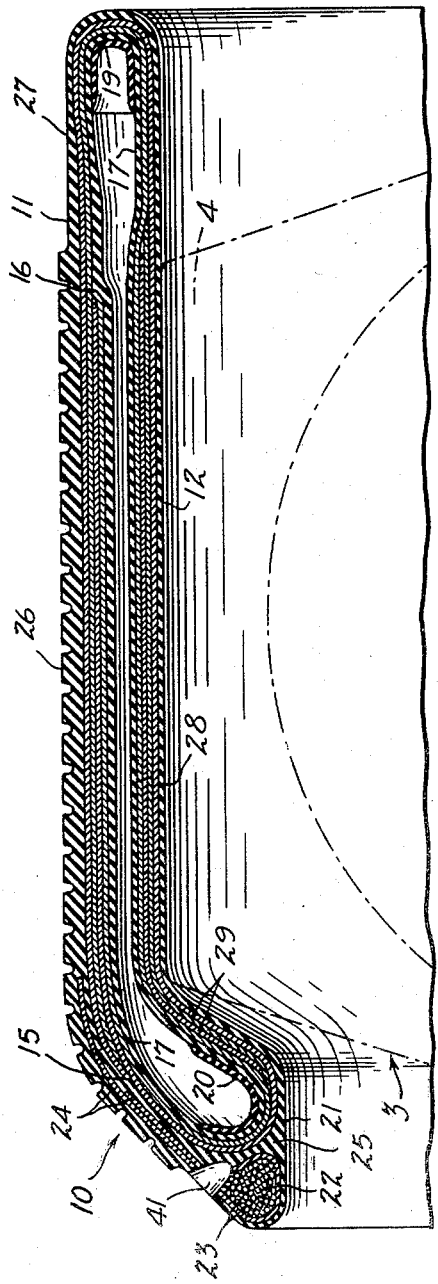
Fig. 4 is a transverse section taken on the line indicated at 4—4 in Fig. 3.
Figure 5:
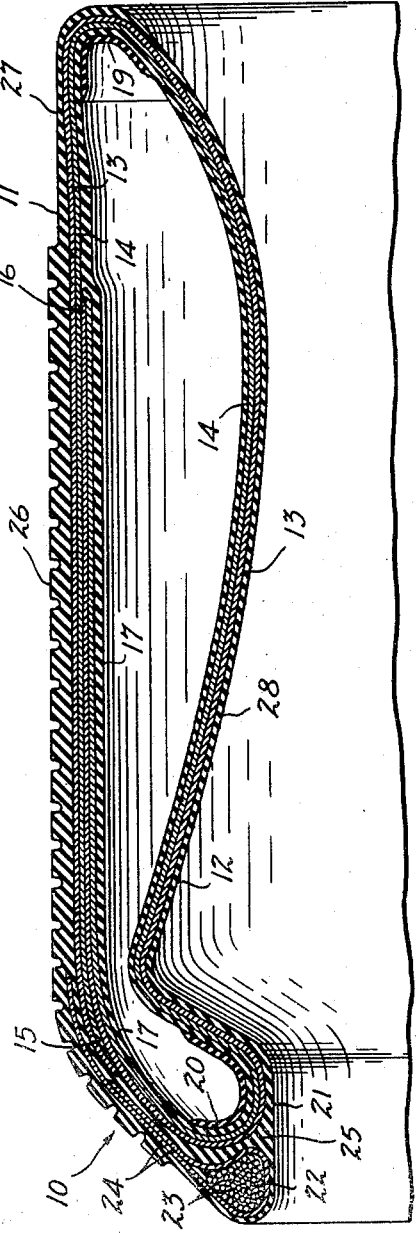
Fig. 5 is a transverse section taken on the line indicated at 5—5 in Fig. 3.

As shown in Figs. 4 and 5, one edge 15 of the ply sheet composed of the plies 13 and 14 is in the exterior wall adjacent the outer edge of the tube 10 and the opposite edge 16 of the ply sheet is also in the exterior wall 11 and spaced inwardly from the inner side edge of the tube. The overlapping of the fabric plies in the exterior wall 11 provides four layers of fabric throughout the major portion of the width of the exterior wall.

The tire is built with an interior layer of rubber 17 to prevent leakage of inflation fluid and the interior of the tire at opposite side edges is provided with reinforcing strips 19 and 20 of rubber which may be adhered to the interior of the rubber layers 17 or placed between the layer 17 and the inner fabric ply 14 as illustrated in Fig. 13 while the strip 19b is shown between an inner rubber layer 17b and an inner fabric ply 14b of the tire. The rubber strips 19 and 20 serve to hold the reinforcing cords at opposite edges of the tire in place when the tire is subjected to internal fluid pressure in the vulcanizing mold. Since the cords are placed under substantial tension in the side edges of the tube when subjected to pressure in the mold, it is necessary to reinforce the edge portions of the tire in order to prevent the cords from cutting through the unvulcanized rubber. The strips 19 and 20 are vulcanized prior to their application to the unvulcanized tire, so that the cords can be subjected to considerable tension without displacement.

In order to insure accurate positioning of the emergency tire on the vehicle tire, the tire 10 is provided with a positioning shoulder at its outer edge which, as illustrated in Figs. 4 and 5, is formed by bending the outer edge portion 21 of the tube inwardly to a diameter less than the internal diameter of the interior wall 12. The tire is first built to a transversely flat form and prior to placing in the vulcanizing mold is expanded within a suitable annular form with an inturned edge portion that bends the edge of the tube to substantially the form shown in Fig. 4 prior to placing in the vulcanizing mold. An inextensible restraining band or bead 22 is attached to the shoulder portion 21. The restraining band is formed by textile cords 23 which are preferred to wire strands for the reason that they are not so subject to deterioration by repeated flexing. The restraining band or bead 22 is attached to the tube 10 by means of a flipper strip 24 which is looped around the bead ring 22 and which has its ends attached to the exterior of the fabric plies in the downturned portion of the exterior wall 11 and a filler strip 25 of rubber is placed between the bead 22 and tube 10.

The edge 16 of the fabric reinforcing strip is spaced outwardly from the inner edge of the tube 10 and is at a distance inwardly of the positioning shoulder 21 substantially equal to the width of the tire tread to which the tube is to be applied. A thin rubber tread 26 is applied to the exterior of the wall 11 and extends from the outer edge of said wall to adjacent the edge 16 of the fabric strip. The width of the tube 10 is substantially greater than the width of the tire tread 4 to which it is applied. The inner edge portion 27 of the exterior wall 11 extends inwardly from past the inner edge of the tread 4 to provide an inner freely expansible portion that engages with the inner shoulder of the vehicle tire tread to grip the same between the shoulder portion 21 of the tube 10 and the inner expansible portion thereof when fluid under pressure is admitted to the tube 10. A thin covering layer 28 may be provided over the exterior face of the fabric in the interior wall 12 and in the edge portion 27 of the exterior wall 11.

The interior wall 12 of the tube 10 is reinforced at regularly spaced intervals circumferentially with transversely extending cord fabric strips 29 that extend substantially the full width of said wall and that are disposed between the plies 13 and 14. The strips are somewhat more resistant to flexing than the plies 13 and 14, being formed of two superposed layers preferably of 30° to 45° cord fabric the cords of which are disposed in crossing relation. The spaces between the transverse stiffening strips 29 are of considerably greater angular length than the strips 29 and these portions of the inner wall 12 are pressed into depressions in the vulcanizing mold to form equiangularly spaced bulges 30 which are flattened against the exterior of the vehicle tire tread and offer no resistance to expansion under fluid pressure so that pressure is initially applied to the tread 4 of the vehicle tire at circumferentially spaced points to start the inward flexing of the vehicle tire at these regularly spaced points and thereby cause the tire tread to form undulations of uniform angular length when collapsed.

A suitable valve stem 31 is provided in the shoulder portion 21 of the tire for inflating the tube 10 after it is placed on the vehicle tire. The inflation can be conveniently effected by means of a carbon dioxide cartridge if desired.

In the modified form of emergency tire shown in Figs. 8 and 9, a tube 10a is formed which has transversely flat exterior and interior walls 11a and 12a reinforced with fabric plies 13a and 14a similar to the plies 13 and 14 above described and reinforced at the sharply curved edges with prevulcanized strips 19a and 20a which may be adhered to the interior of the inner rubber layer 17a or to the rubber layer 17 and the inner fabric ply as shown in Fig. 13. Except for the form of positioning shoulder, the tube 10a is substantially the same as the tube 10 previously described. In this modification a restraining band or bead ring 32 of less diameter than the interior wall is composed of circumferentially extending textile cords 33 enclosed in a supporting strip 34 of cord fabric that is stitched to the outer edge and top wall portion of the fabric reinforcing strip formed by the plies 13a and 14a. The supporting strip 34 provides a flexible web connecting the bead 32 to the outer edge of the tube 10 and this web is preferably covered by a layer of rubber 35 which extends from the interior wall 12a of the tube 10a and around the bead ring 32. A suitable valve stem 36 is provided in the inner wall 12a closely adjacent the flexible web which has an opening 37 through which access is had to the valve stem. The reinforcing strip formed by the fabric plies 13a and 14a overlap in the exterior wall 11a of the tube and a tread 26a overlies the overlapped portion of the fabric strip and extends over the outer edge of the tube 10a. An internal layer 17a of rubber is provided but the exterior face of the rubberized fabric tube is uncovered except at the tread portion.

The interior wall 11a is provided with transversely extending stiffening strips 29a that are disposed between the plies 13a and 14a at regularly spaced intervals. Bulges 30a are provided in the weaker portions of the inner wall so that pressure is initially applied to the vehicle tire tread at regularly spaced points circumferentially thereof.

In both modifications of the emergency tire shown an inextensible band is provided at the outer edge of the endless inflatable tube and, while the tread portion of the tube is reinforced by additional layers of fabric, it is not as positively held against radial movements during inflation as the edge portion of the tube to which the inextensible restraining band or bead ring is attached. Since the tube 10 is held during inflation against radial movement only along a single narrow circumferential zone at its outer side, the tube during inflation to toroidal form tends to swing inwardly about the no-expansion zone, so that if a relatively slight force in an axial outward direction is exerted on the bead portion of the tire during inflation, the tread of the vehicle tire will be forced outwardly as illustrated in Fig. 2 of the drawings.

Various devices may be provided for restraining the tread portion of the emergency tire against axial inward movement during inflation. As shown in Figs. 10 and 11, a flexible strap 38 may be provided with suitable means such as the hook 39 shown in Fig. 10 or the hook 42 shown in Fig. 11 for attachment to diametrically opposite portions of the bead. The web 35 may be provided with openings 40 to receive the hooks 39 and recesses 41 may be molded in the shoulders 21 to receive the hooks 42.

To apply the emergency tire the wheel with its deflated pneumatic tire is lifted off the ground by means of a jack applied to the vehicle body and the flat emergency tire is slipped over the vehicle tire tread from the outside and is positioned by engagement of its inwardly projecting shoulder with the outer shoulder of the vehicle tire. The inflation of the emergency tire is preferably effected by connecting a cartridge containing carbon dioxide or other gas under compression to the emergency tire valve stem.

It is usually unnecessary to shift the vehicle tire during its collapse but in certain makes of automobiles the wall clearance between front wheels and steering elements makes it desirable to shift the vehicle tire in order to avoid danger of engagement of the inner side wall of the collapsed tire with such steering elements. When it is desired to shift the vehicle tire with respect to its rim to reduce the overhang of the collapsed inner side wall thereof, the strap 38 may be attached to the emergency tire bead prior to inflation and an outward pull is exerted on the strap during the collapse of the vehicle tire.

It is to be understood that in accordance with the provisions of the patent statutes, variations and modifications of the specific devices herein shown and described may be made without departing from the spirit of the invention.

What we claim is:

1. The combination with a vehicle wheel having thereon a deflated pneumatic tire of an emergency tire in the form of an endless flexible and inflatable tube of transversely elongated cross sectional form with closely spaced radially interior and exterior walls that are substantially flat in transverse section and of a width greater than the width of the vehicle tire tread, said interior wall being of a perimeter to fit upon the tread of the vehicle tire, means for restraining circumferential stretching of said tube and for causing the tube to expand radially inwardly and apply pressure to said deflated tire tread to collapse the same upon inflation of said tube, and means for causing said interior wall of the tube to apply radial inward pressure to said vehicle tire tread at equiangularly spaced points circumferentially thereof to form circumferential undulations of equal angular length in the collapsed tread of the deflated tire.

2. The combination with a vehicle wheel having thereon a deflated pneumatic tire of an emergency tire in the form of an endless flexible and inflatable tube of transversely elongated cross sectional form with closely spaced radially interior and exterior walls that are substantially flat in transverse section, said interior wall being of a perimeter to fit upon the tread of the vehicle tire, said tube having a circumferentially continuous positioning shoulder at its axially outer side edge that projects radially inwardly past said interior wall for engagement with the axially outer shoulder of the deflated vehicle tire tread, said exterior wall having a tread portion that extends axially inwardly from said outer edge of said tube and that is less flexible than the remainder of the tube, the axially inner edge of said tread portion being adjacent the axially inner edge of the vehicle tread when the tube is positioned by said shoulder on the vehicle tire, said inner and outer walls being of a width greater than said tread portion to provide a flexible axially inner portion that projects past the axially inner side edge of the vehicle tire tread, means reinforcing said tube to resist circumferential stretch and to cause said tube to expand radially inwardly against the periphery of the vehicle tire tread to collapse the same into the space between the side walls of the vehicle tire and to expand said flexible inner portion against the inner side of the vehicle tire to exert an axial outward thrust on the vehicle tire tread as it collapses.

3. The combination with a vehicle wheel having thereon a deflated pneumatic tire of an emergency tire in the form of an endless flexible and inflatable tube of transversely elongated cross sectional form with closely spaced radially interior and exterior walls that are substantially flat in transverse section, said interior wall being of a perimeter to fit upon the tread of the vehicle tire, said walls being wider than the tread of the vehicle tire and said exterior wall having a tread portion narrower than said wall that is less flexible than the remainder of the tube, means for restraining circumferential stretching of said tread portion and for causing said tube to expand radially inwardly against the periphery of the vehicle tire tread to collapse the same between the side walls of the vehicle tire, and means reinforcing said interior wall to provide equiangularly spaced narrow transverse zones resistant to radial expansion and intermediate zones of greater angular width and of greater flexibility through which radial pressure is applied to the vehicle tire tread at equiangularly spaced points to collapse the tire tread and to form undulations in the collapsed tread that are of uniform circumferential length.

4. An emergency tire for mounting on a deflated vehicle tire comprising an endless inflatable tube that is substantially flat in transverse section with closely spaced radially interior and exterior walls that are bendable transversely and circumferentially to enable the tube to assume a form substantially round in cross section when the tube is subjected to internal fluid pressure, said exterior wall having a tread portion of less width than said wall that is less flexible than the remainder of the tube, said tread portion having its axially inner side edge spaced outwardly from the axially inner edge of said outer wall and its axially outer edge closely adjacent the axially outer edge of said wall, means forming a continuous integral positioning shoulder projecting radially inwardly at the axially outer side edge of said tube, and means for holding the axially outer side edge of said tube against radial expansion upon inflation.

5. An emergency tire according to claim 4 in which the means for holding the axially outer side edge of the tube against expansion is in the form of a restraining band forming part of the positioning shoulder.

6. An emergency tire according to claim 4 in which the endless inflatable tube is formed of rubber and is reinforced by superposed tubular plies of cord fabric that have edge portions overlapping in the radially exterior wall of the tube throughout the major portion of the width of said tread portion.

7. An emergency tire for mounting on a deflated vehicle tire comprising an endless flexible inflatable tube that is substantially flat in transverse section with closely adjacent interior and radially exterior walls, said tube being formed of rubber with superposed bias cut cord fabric plies extending throughout the transverse circumference thereof and overlapping from near the axially outer side edge across the major portion of the width of said exterior wall, a rubber tread narrower than said exterior wall and covering the portion of the exterior wall in which said plies overlap, and a narrow substantially inextensible but flexible restraining band attached to the axially outer side edge of said tube.

8. An emergency tire according to claim 7 in which said restraining band is composed of textile cords.

9. An emergency tire for mounting on a deflated vehicle tire comprising an endless flexible inflatable tube that is substantially flat in transverse section with closely adjacent radially interior and exterior walls, said tube having a tubular fabric reinforcement comprising superposed plies of bias cut cord fabric, a rubber tread of less width than said exterior wall applied to said exterior wall, said interior wall having inwardly bowed bulges formed at equiangularly spaced points throughout its circumference and transversely extending fabric reinforcing strips secured to said plies intermediate said bulges.

References Cited in the file of this patent

UNITED STATES PATENTS 641,735     Theis                 Jan. 23, 1900
2,365,279     Kraft                 Dec. 19, 1946